United States Patent [19]

Kiyama et al.

[11] 4,254,515

[45] Mar. 10, 1981

[54] COMPOST-TYPE TOILET EQUIPMENT

[76] Inventors: Torao Kiyama, 8764-66, Shimofukumoto-cho; Satoshi Kiyama, 12-3, 2-chome, Minamisakae, both of Kagoshima-City, Japan

[21] Appl. No.: 91,557

[22] Filed: Nov. 5, 1979

[30] Foreign Application Priority Data

Nov. 21, 1978 [JP] Japan .................................. 53/161134

[51] Int. Cl.³ .............................................. A47K 11/02
[52] U.S. Cl. ........................................ 4/449; 4/111.1; 4/111.6; 4/111.5; 4/472; 4/DIG. 12; 4/DIG. 19; 4/347; 71/8; 210/178
[58] Field of Search ................ 4/111.1, 463, DIG. 12, 4/DIG. 19, 300, 472, 320, 317, 321, 322, 323, 318, 319, 347–449, 111.2, 111.5–111.6; 210/179, 178, 220; 422/225; 71/8, 9, 10

[56] References Cited

U.S. PATENT DOCUMENTS

| | | | |
|---|---|---|---|
| 3,840,907 | 10/1974 | Sundberg | 4/DIG. 12 |
| 3,859,672 | 1/1975 | Modig | 4/111.1 |
| 3,882,552 | 5/1975 | Turner | 4/320 |
| 3,918,106 | 11/1975 | Hellqvist | 4/463 |
| 3,921,228 | 11/1975 | Sundberg | 4/DIG. 12 |
| 4,170,797 | 10/1979 | Sundberg | 4/300 |
| 4,196,477 | 4/1980 | Stewart | 4/472 |

FOREIGN PATENT DOCUMENTS 1054307  5/1979  Canada .............................. 4/DIG. 12

OTHER PUBLICATIONS

Humus–Toilet, 10–1972, Switzerland Publication.
Mullbank-, 4–1971, Swedish Publication.

*Primary Examiner*—Henry K. Artis
*Attorney, Agent, or Firm*—Armstrong, Nikaido, Marmelstein & Kubovcik

[57] ABSTRACT

A compost-type toilet which includes: a solid-liquid separating means which also serves as a means for transferring the solid component of excrement mounted below the opening of a bowl; a means for treating the liquid component of excrement provided beneath the solid-liquid separating means. The liquid component treating means contains various kinds of adsorbent materials capable of adsorbing the liquid component separated by the above mentioned solid-liquid separating means and the inner structure is so constructed as to enhance the air ventilation to vaporize or volatilize the liquid component adsorbed with the adsorbent materials; a means for treating the solid component of excrement is provided in a position adjacent to the solid-liquid separating means in the transferring direction to the solid component separated by the above mentioned solid-liquid separating means. The means for treating the solid component is a treatment chamber comprising a supply device for an auxiliary agent for treatment of the solid component mounted in the upper part thereof and a stirring apparatus contained in the lower part; and, a storing part for the treated solid component and excessive liquid component provided by communicating the said means for treating a solid component and a liquid component therewith, whereby the above mentioned means and devices are formed to one unit.

18 Claims, 6 Drawing Figures

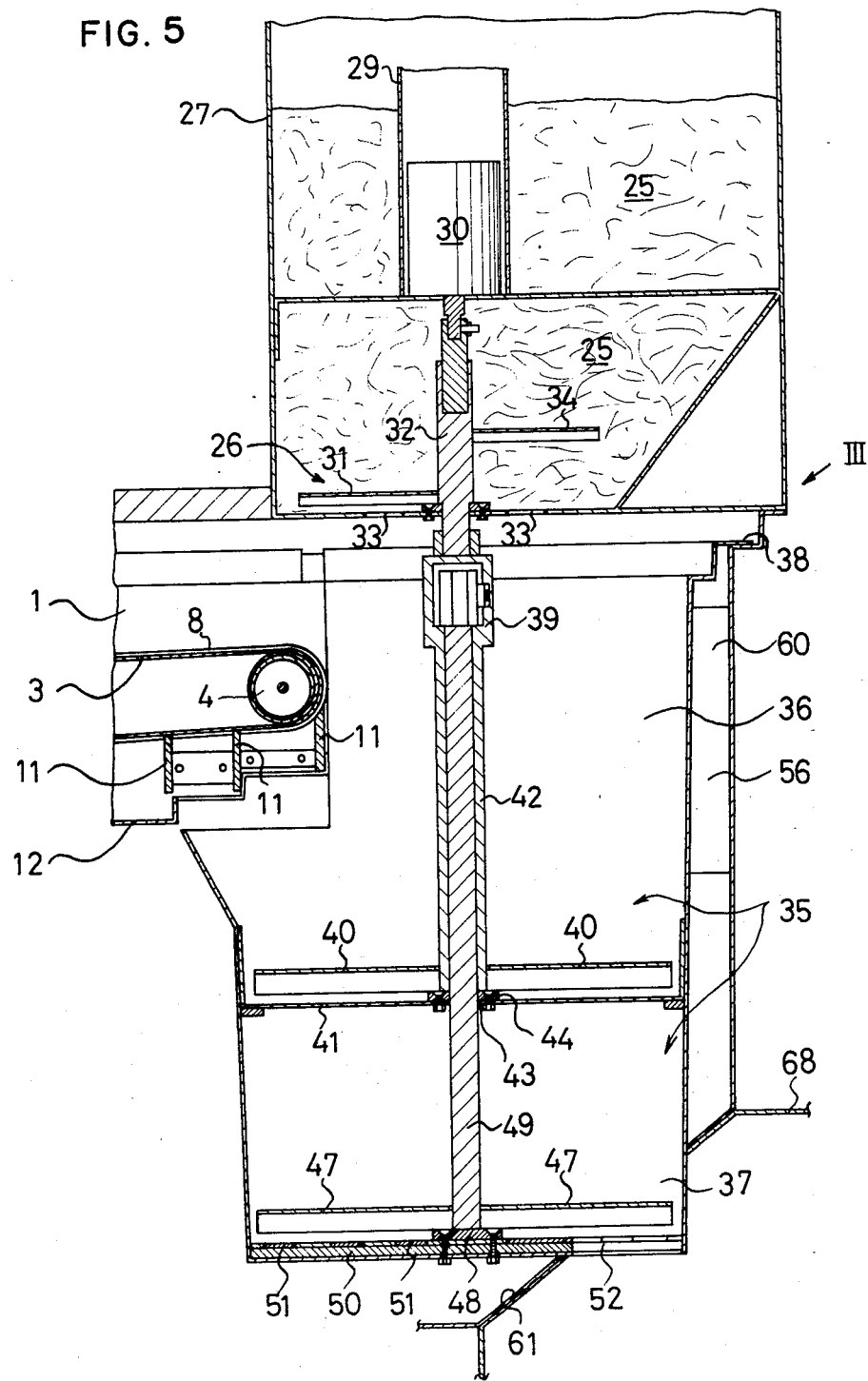

COMPOST-TYPE TOILET EQUIPMENT

BACKGROUND OF THE INVENTION

It is well known that compost-type toilets, which are constructed to take out of the toilet the decomposition-treated solid component in excrement after removing the liquid component by volatilizing or vaporizing, has utility in the areas where there is no sewer system provided, or abandonment of excrements into waste water disposal pits is forbidden to prevent pollution of the underground water and the like. Although extensive research and development work has been conducted with a specific view to increasing the treatment capacity (especially, the capacity for volatilizing the liquid component) to treat completely excrement from a large number of persons, the compost-type toilet equipment conventionally used in the past, because it is constructed to treat the excrement (solid or liquid wastes) simultaneously without separation, requires no enormous amount of time and energy for vaporization or volatilization of the liquid component, and has serious imperfections, as is particularly the case in areas or locations of low temperature and high humidity, such as a marked decrease in the treatment capacity which causes excrement, especially liquid wastes, to overflow outside the equipment. Additional installation of a means for heating and vaporization such as a heater to increase the vaporization capacity for liquid wastes, not only makes the construction complex but also expensive. Specific examples of the conventional compost-type toilet equipment are for example described in Japanese Patent Publication No. 35342-1975 and Japanese Patent Application No. 66476-1973. The present invention has been made with the specific aim of solving the above-mentioned drawbacks pertaining to the conventional compost-type toilet.

SUMMARY OF THE INVENTION

The present invention relates to a compost-type toilet. It is an objective of the present invention to provide a compost-type toilet having improved treatment capacity. The compost-type toilet according to the present invention is designed to be of the following construction, as being briefly described below: a solid-liquid separating means for separating excrement into a solid component (solid waste) and a liquid component (liquid waste) mounted below the opening of a bowl; a means for treating the liquid component and a means for treating the solid component provided in succession to the said solid-liquid separation means and constructed so as to be able to treat solid and liquid components after they are completely separated, with the treatment capacity being thus increased. The means for treating the liquid component is constructed of a multi-stage shelf structure to enhance air ventilation thereby increasing the effect of vaporizing the liquid component. The means for treating the solid component is provided in several stages with the treatment chambers equipped with a stirring mechanism, respectively to thereby efficiently mix the solid component supplied from the separating means with an auxiliary agent for treatment of the solid component supplied from a supply device for an auxiliary agent for treatment of the solid component in the upper portion, thus increasing the treatment capacity. The solid-liquid separating means, means for treating the liquid components, means for treating the solid component, and each of the devices attached to these are disposed in one independent unit, whereby each of the components of the unit is exchangeably engaged in one casing to thereby form the compost-type toilet of the invention.

BRIEF DESCRIPTION OF THE DRAWINGS

FIG. 5 is an enlarged vertical longitudinal sectional view of the means for treating a solid component;

DETAILED DESCRIPTION OF THE INVENTION

Figure 1:
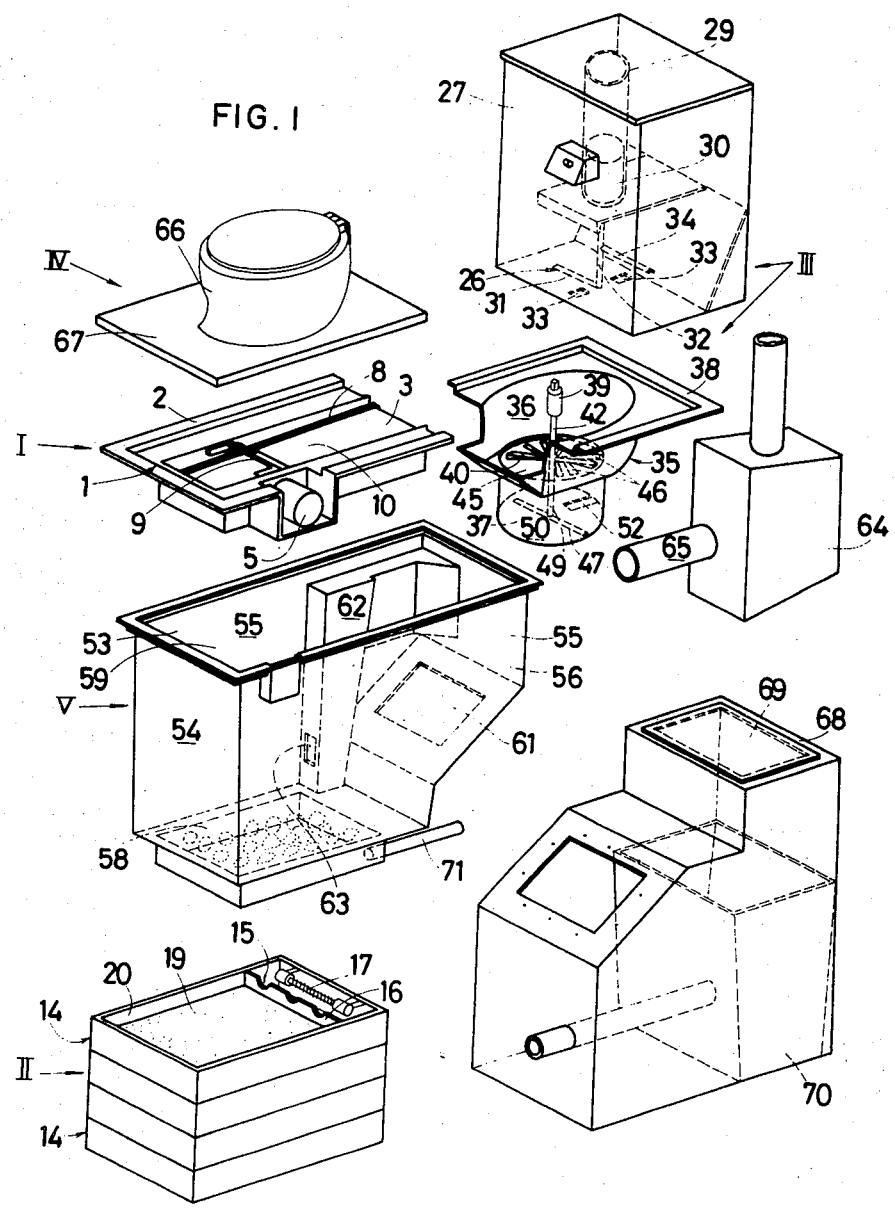
FIG. 1 is a perspective view of the compost-type toilet equipment, when being disassembled, illustrating one embodiment of the present invention.

The compost-type toilet equipment according to the present invention, the major objective of which is to increase treatment capacity to enable a large number of people to use it, comprises a solid-liquid separating means arranged below the opening of a bowl to separate excrement into the liquid and solid components, and means for treating the liquid component and for treating the solid component provided in succession to the said solid-liquid separating means to treat the separated liquid and solid components, respectively, whereby the means and devices in the attachment thereto are each formed into independent, single units so that they can be exchangeably combined into the compost-type toilet equipment.

Referring now to the drawings attached hereto, the present invention will be described in detail in the following:

The compost-type toilet equipment according to the present invention comprises a solid-liquid separating means (I) positioned below the opening of bowl (IV), a means (II) for treating the liquid component provided beneath the said separating means so as to treat the liquid component which is separated by the said separating means and flowing down therein, and a means (III) for treating the solid component which has the function of mixing the solid component with an auxiliary agent for treatment of the solid component. The means (III) is provided in the direction of movement of the solid component which is separated by the said separating means, whereby the opening of bowl (IV), the solid-liquid separating means (I), the means (II) for treating the liquid component, and the means (III) for treating the solid component are removably mounted on the casing of the toilet equipment. To the said casing are attached an air ventilating means in communication with the above-mentioned means (II) for treating a liquid component and a storage chamber which communicates with the means (III) for treating a solid component and acts to treat by decomposition of the solid component and store the liquid component.

The solid-liquid separating means (I), comprising a frame member (1) and an endless revolving belt (3) disposed in the frame member (1) which receives on the surface of the said belt (3) excrement falling from the opening member of a bowl (66) and transfers, by revolving the belt, the solid component alone to the means (III) for treating the solid component, while allowing the liquid component fall and thereby effect a solid-liquid separation.

Figure 2:
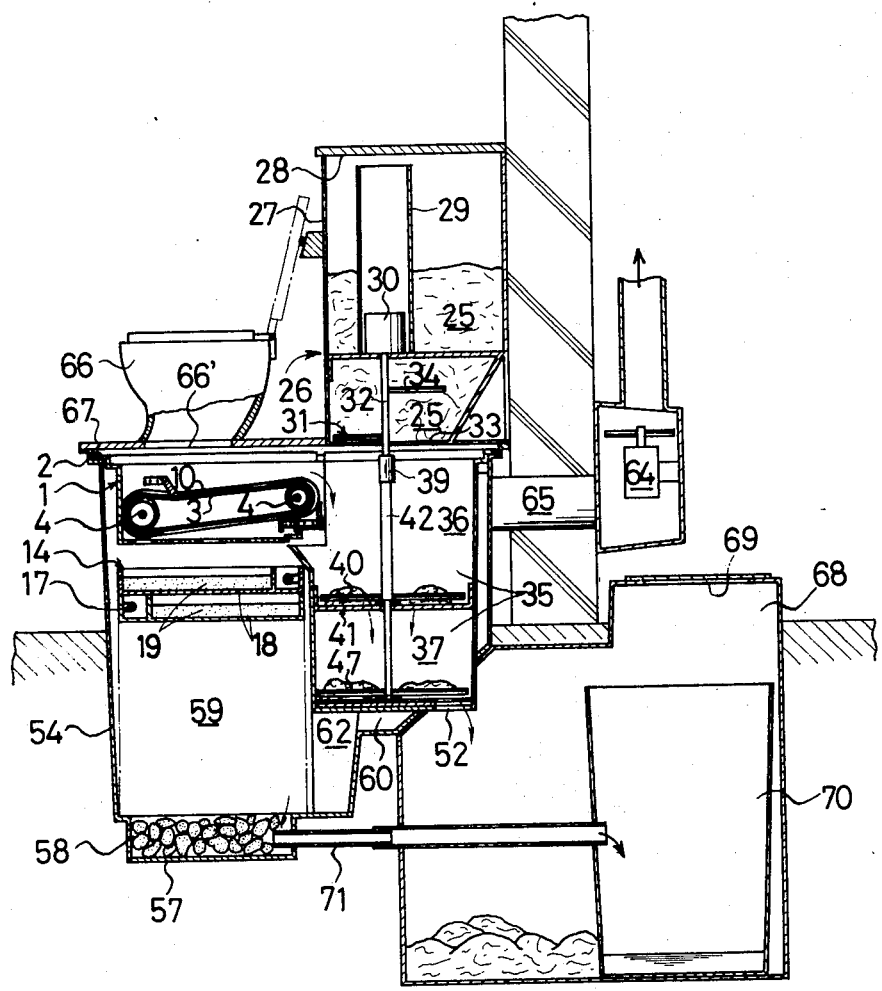
FIG. 2 is a vertical longitudinal sectional view of the compost-type toilet equipment in the assembled state.
Figure 3:
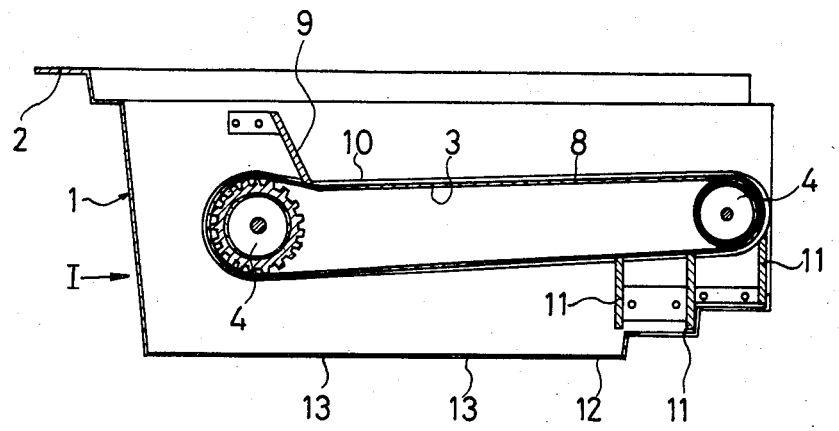
FIG. 3 is a central vertical longitudinal view of the solid-liquid separating means.
Figure 4:
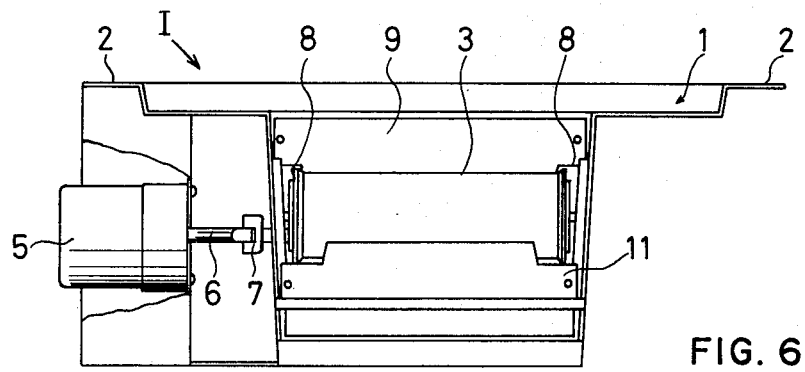
FIG. 4 is a side elevational view taken from the right-hand side of FIG. 3.

More specifically, as shown in FIGS. 1, 3 and 4, the frame member (1) has an open top and side communicating with the means (III) for treating a solid component, with the upper periphery forming a lip with a projecting configuration for engagement with the casing (V). Bottom plate (12) is provided with a port (13) formed for removing the liquid component. The endless revolving belt (3) which is provided in the said frame member is attached by stretching between the rollers (4), (4) and supported inside the said frame member in an inclined condition with one of the rollers being disposed higher (the right one shown in the central part of FIG. 2), and is actuated by a motor (5) connected to revolving shaft (6) of one of the rollers (4) through a connection member free to be engaged and released. In addition, the belt (3) is provided on both of the side peripheries circumferentially with projecting rims (8), (8) as shown in FIGS. 3 and 4. The top surface (3) is constructed in a slightly concave shaped cross section, and is adapted to be compressed on its top surface by the lower end of a scraper (9) fixed inside the frame member (1) at both side ends to thereby form a water-collecting part on the top surface of surface (3) at a location just below the opening of bowl (66). The water-collecting chamber (10), by allowing the liquid component to reside therein, prevents the solid component (solid wastes or feces) from sticking to the belt (3) and simultaneously imparts a suitable degree of moisture to the solid component, thus facilitating easily and efficiently the treatment by the means (III) for treating the solid component. In the present invention, to prevent the solid component from adhering to the belt (3) there is provided a plurality of scrapers (11) on the belt (3) at the lower position in the vicinity of the means (III) for treating the solid component, as being shown in FIG. 3. Each of the scrapers (11) acts simultaneously, and there is an opening on the bottom plate (12) of the frame member below the scrapers to permit transfer of solids removed from the belt (3) by each of the scrapers (11) into the means (III) for treating the solid component.

Figure 6:
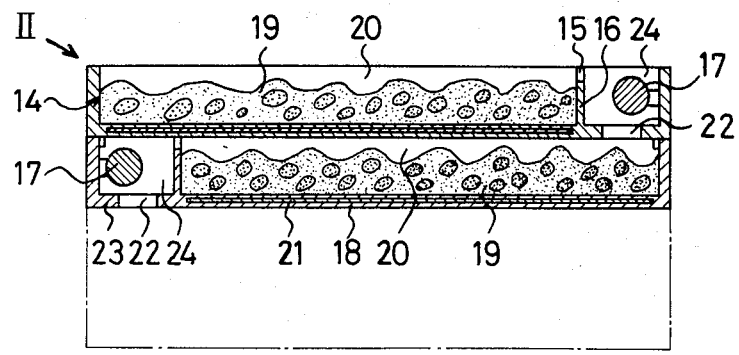
FIG. 6 is an enlarged vertical longitudinal sectional view of the means for treating a liquid component.

The means (II) for treating the liquid component is disposed below the above mentioned solid-liquid separating means is constructed in a multi-stage shelf form, with the right and left hand shelves alternatively reversed, a multiple number of the unit box members (14) being each provided vertically with a partition wall (16) having a cut-out portion (15) for overflow formed at one side to thus divide the inside into treatment chambers (20) and side chambers (24); the treatment chambers (20) being provided on the bottom plate (18) with a plate-form heater (21) inwardly; the side chamber (24) having a hole (22) for downward passage of a liquid component and ventilating of air formed at the bottom plate (23), as shown in FIGS. 2 and 6, whereby the treatment chamber (20) of each of the unit box members is filled with adsorbent materials for liquids such as porous pumice and zeolite, and the side chamber (24) is provided inside with a heater (17), Formed below the said means (II) for treating a liquid component is a holding chamber (58) designed to hold excessive liquids produced when a liquid portion is introduced surpassing the capacity of the unit; the holding chamber being filled with adsorbent materials.

The means (II) for treating the liquid component communicates with an air-ventilating device (64) separately disposed so as to exhaust air (containing a large amount of liquid component) in the means for vapourizing a liquid component. The ventilation system may be adapted to exhaust the air in each of the unit box members (14) by suction of air in the direction of the arrow on FIG. 2 through a ventilation passage (62), or may be designed to enhance vapourizing the liquid component through a two-way flow of air by allowing an air blower and a ventilator constituting the airventilating device (64) to communicate separately with each of the unit box members (14) to thus conduct air blowing and exhausting on each of the unit box members (14), independently.

The means (III) for treating a solid component comprises a supply device (26) for the auxiliary agent (25) disposed in the upper part thereof for treatment of the solid component and a treatment chamber provided in the inside with a stirring device being provided in the lower part thereof; the supply device (26) for an auxiliary agent (25) for treatment of the solid component is designed to allow peat moss as the auxiliary agent contained in the container (27) via a port (28) formed above to fall through port (33) on the bottom thereof by revolution of a revolving shaft (32) provided with stirring blades (31) and having part of its lower end projecting through the container (27) and connected for actuation with a motor (30) mounted inside a cylinder member (29) which has an opening formed at the top, whereby the upper stirring blade (34) acts to prevent the peat moss from being agglomerated or solidified in the container.

Below the chamber containing the peat moss is provided a treatment chamber (35) equipped with a stirring device which consists of an upper, primary treatment chamber (36) and a lower, secondary treatment chamber (37). The primary treatment chamber (36) and the second treatment chamber (37) are provided in one casing which may be made of the fiberglass reinforced polyester resin. The primary treatment chamber (36) is provided with a peripheral lip for fitting by engagement with the opening of the casing, which extends obliquely toward the upper end thereof, and contains in its inside a treatment chamber which is open at the top and solid-liquid separating means; the said treatment chamber being provided in the center connecting member (39) which receives by insertion at its upper end the lower end of the above mentioned revolving shaft (32) to transmit the revolution and contains a ratchet mechanism; the said connecting member (39) being connected with a hollow revolving shaft (42) provided at the lower end with stirring blades (40) spaced a short distance from the bottom plate (41) and made of the same material as for the above mentioned scraper (9) disposed in the center of the bottom plate (41) of the treatment chamber (36), whereby the revolving shaft is supported by a bearing plate (44) provided at the center with a through bore of the same diameter as the hollow portion of the revolving shaft (42).

In the center of the casing having a side wall of primary treatment chamber (36) and the secondary treatment chamber (37) formed in one piece is formed the bottom plate (41) of the primary treatment chamber (36) by erecting a separate plate. Although the primary treatment chamber and secondary treatment chamber may be both formed in one piece, the maintenance and inspection is easier for the secondary treatment chamber (37), when the bottom plate (41) of the primary treatment chamber (36) is free to be engaged and released. The embodiment described in the example shows the latter.

As shown in FIGS. 2 and 5, the solid-liquid separating means (I) is fixed, with its end projecting slightly into the primary treatment chamber (36), while a port for solid components is provided on the bottom plate in such a way that a bottom support plate (46) remains on its side while the solid component separated by the solid-liquid separated means falls and at the reverse position. In case such a port solid components (46) provided on the bottom plate (41), the port for peat moss (33) is set in such a manner as it may be just above the position of the said bottom support plate (46).

The secondary treatment chamber (37), positioned below the primary treatment chamber (36) and serving as a chamber where the fallen solid component is allowed to stand to be decomposed by microorganisms contained in the peat moss or the solid component, is provided vertically at the center with a revolving shaft (49) mounted on the bottom part with stirring blades (47) and having its upper part passing through a through-bore (43) of the bearing plate (44) of the primary treatment chamber (36) to thereby be inserted into the revolving shaft (42), with the upper end being fixed on the connecting member (39) of the ratchet mechanism. The ratchet mechanism, which is exemplified by structures which are commercially available such as ratchet wrenches, is so adapted as to cooperate only when the revolving shaft (42) of the primary treatment chamber (36) operates to revolve in reverse, but not to revolve when it revolves normally. The bottom plate (50) of the secondary treatment chamber (37) may be constructed of a single plate of material, but preferably the plate material is provided with a plate-form heater capable of being set at an appropriate temperature, because such heaters lead to improved decomposition of solid component. And, the bottom plate (50) is made open at one side and has for example an opening (52) to the side of a storage chamber for the solid component, so as to facilitate the discharge of the solid component being treated in the treatment chamber (37) out of the chamber by the above mentioned stirring blades (47).

The casing of the toilet equipment (V) is in a form of a box member with the top made open and comprising a front wall (54), side walls (55), a rear wall (56) and a bottom wall (57), as being shown in FIGS. 1 and 2. The opening (53) at the top is so constructed as to possess the dimension and shape to enable the above mentioned solid-liquid separating means (I) and treatment chamber for solid component (35) which engages the front and rear portions, respectively; to occupy the space (59) having in it means (II) for treating a liquid component provided in the front part and a holding chamber (58), in the lower part, being packed with a liquid adsorbent material (19) to store liquids, and the space (60) in the rear of the said space to contain the treatment chamber for solid components (III). The said space (60) is further provided on the rear wall (56) with an opening (61) to enable the solid components to be supplied therefrom to a storing part to be described afterwards. (62) shown in the Figures designates a ventilation passage provided with a ventilating port (63) to circulate air in the space (59), especially in the area of the holding chamber (58) and the vicinity and/or the unit box members (14) for vapourizing a liquid component down to the means (II) for treating a liquid component. The ventilation part is connected via a pipe (65) with the circulating device (64) installed outside the equipment.

On the top of the casing (V) with which these means are all securely fixed is placed the opening of bowl (IV) comprising a stool (66) and a lid plate (67) so that it is situated right above the solid-liquid separating means (I). Above the treatment chamber (35) is the supply device (26) for an auxiliary agent, such as peat moss, for treatment of the solid component, whereby the storing chamber for solid components (68) is mounted on the rear wall of the casing (V) for communicating with the other through the opening (61).

The storing chamber for solid components (68), is situated below the port (52) for passage of solid components of the secondary treatment chamber (37) and is set in such a way that it projects into the opening (61), as shown in FIG. 2 and is adapted to receive the solid component fallen down from the opening (52) after having been partly treated or partially decomposed by the microorganisms, with its volume designed to store a determined amount of solid components, and is intended for installation by burying in the soil, normally.

(69) designates another entrance to the said storing part (68) and, (70) is a container for liquid component installed inside the storing part (68), and is connected by a pipe (71) with the holding chamber (58) of the casing (V) to allow excessive portions of the liquid component in the holding chamber to flow therein.

With regard to electrical elements in each of the above mentioned means and parts, the heaters and ventilating means are designed to operate constantly, and the belt (3) of the solid-liquid separating means (I) is allowed to revolve only when the lid of the toilet stool (66) is open, by a switch mounted in such a position to enable it to cooperate with the lid, while an electrical connection is made to revolve the stirring blades simultaneously with,, or at a delayed time from, the belt. The stirring blades (47) of the secondary treatment chamber (37) are permitted to revolve once or twice a day or once every two days through control by a timer attached to the motor for normal and reverse operation.

It will be seen from the structure of the present invention described above, when the lid of the toilet stool (66) is open for usage of the toilet, the motor is actuated by the action of opening the lid to revolve the belt (3), whereupon the liquid and solid wastes are expelled and discharged on the revolving belt. Normally, the liquid wastes are discharged first on the belt (3), and the discharged liquid component is partly deposited in the water-collecting part (10), while the excess is allowed to flow over the projecting rims (8) at the sides of the belt (3) downwards; passing through the port (13) on the bottom plate (12) of the equipment and then into adsorbent material (19) in the upper part of the means (II) for treating the liquid component to be adsorbed. The excess portion flows over the cut-out portion (15) of the partition wall (16) and enters side chamber (24) through the chamber for adsorbing liquids (20), then flows through hole (22) on the bottom plate (23) into the lower stage of the unit box member (14) for vapourizing the liquid component.

The liquid component which has not been adsorbed with the adsorbent material is finally adsorbed with adsorbent material in the holding chamber (58), while remaining excess liquid component flows through the pipe (72) into the container for liquid component (70) to thereby be vapourized. The portion of the liquid component which has been adsorbed in the means (II) for reating a liquid component is allowed to be vapourized from the adsorbent material and discharged outside the equipment by exhausting by suction the air in the unit box means for vapourizing the liquid (14) or the holding chamber (58) by the ventilating device (64) through the suction portion (63), and by heating, and then circulating, the air in each of the unit box members by the heaters (17) (21) to thus vapourize the liquid component in the adsorbent material (19) outside the equipment. In this case, when the air take-out ports are provided with box members (14), inclusive of the lower stage one, for connecting with the suction port (63), the air with reduced moisture content becomes available to each of the unit box members, bringing about enhanced vapourization of liquid component. Utilization as the adsorbent material of pumice in pebble form which may be collected from a pumice bed results in increased adsorption of the liquid component, along with a facilitated release thereof.

Solid components such as solid wastes and paper separated by the solid-liquid separating means (I), once placed on the water-collecting part (1), are transferred successively by the belt (3) to the direction of the belt end to finally fall on the bottom plate (45) for supporting the solid component, whereby the solid component, after being discharged first on the water-collecting part (10) to thus allow paper and the like to adsorb part of liquids remained thereon, is next transferred to the bottom plate (45), in a moderately wet state susceptible to decomposition by microorganisms. A major portion of the solid component falls downwards from the belt (3) while the rollers (4) revolve, while a minor adhering portion is scraped off first by the first scraper with its acute-angled tip (11), and then by subsequent scrapers which compress against the belt.

The solid component supplied to the primary treatment chamber (36) comes in adhering contact with peat moss supplied by a supply device for peat moss (26) which is actuated by revolution of the belt, and is made to fall to the secondary treatment chamber (37) through the port (46) by the revolving stirring blades (40).

In the secondary treatment chamber (37), the solid component adhered with peat moss is placed under conditions of controlled temperature, whereupon there is produced a condition for decomposing of the solid component due to the moisture contained therein and imparted from the water-collecting part, thus accelerating the decomposition by microorganisms.

After being allowed to stand for one or two days in the chamber, the motor (30) revolves and acts on the ratchet mechanism of the connecting member (39) to rotate the stirring blades in the secondary treatment chamber (37), thus supplying the solid component decomposed by microorgansims from the chamber to storage chamber (68) through the opening (52). In the said storage chamber (68), the solid component is warmed, as the case may be, or is allowed merely to stand to proceed to further decomposition into the compost. The solid component when completely decomposed into compost is taken out of the storing chamber (68) to be utilized as fertilizer, abandoned or disposed of in different ways.

In the compost-type toilet equipment according to the present invention, as described above, excrement is separated in the solid and liquid components by the solid-liquid separating means (I), while the solid component is provided with an appropriate degree of moisture by the water-collecting chamber (10) which is disposed, to produce a condition favourable for decomposition by microrganisms, to attain thorough mixing and adequate adherence of peat moss with the solid component, and to easily warm the treatment chamber to facilitate decomposition, thus allowing the solid component to be decomposed rapidly. In addition, from the standpoint of the character of adsorbent materials utilized and the structure or construction of the means for vapourization, the liquid component is vapourized with improved vapourization and the toilet equipment is free from the serious imperfection of the liquid component flowing out but not being vapourized, as is often the case with the conventional device. This eliminates the problem of the liquid component flowing out of the holding chamber (58) and container for the liquid component (70), even when too much liquid waste is discharged at once, or the vapourization performance is decreased too much. Further, the major components according to the present invention which are removable from the casing (V), are attached by screwing to casing. The installation working is therefore easy, while maintenance and inspection are quite easily carried out by releasing the fixed parts out of the casing of equipment to take out the defective or damaged element for repairing or replacement with new one.

I claim:
1. A compost-type toilet comprising:
   a bowl having a toilet stool disposed on the top thereat and having an opening formed inside the lower part to permit discharge of excrement;
   a solid-liquid separating means mounted below the above-mentioned opening, which comprises an endless revolving belt disposed in a frame member having a port for removing the liquid component disposed at the bottom of the frame and having an opening for transferring the solid component disposed on one side of the frame;
   means for treating the liquid component provided beneath the above-mentioned solid-liquid separating means, and comprising a plurality of units disposed one atop the other and packed inside with adsorbent material for the liquid component and having an opening formed to allow excessive liquid component and air to flow down and to circulate, respectively;
   means for treating the solid component provided in communication with the above-mentioned means for treating the liquid component, which comprises an upper half which is means for supplying an auxiliary agent for treatment of the solid component and a lower half which is a treatment chamber equipped with a stirring device for mixing the solid component with an auxiliary agent for treatment of the solid component;
   storing means having a casing shape disposed in communication with the above-mentioned means for treating the solid component;
   an air ventilating device comprising an air ventilating means mounted at a predetermined position in a ventilating passage in communication with the inside of the above-mentioned means for treating a liquid component.
2. A compost-type toilet according to claim 1, wherein the endless revolving belt of the solid-liquid separating means is disposed in an inclined condition with the end on the side of the means for treating a solid component at the higher level, and the top surface of the belt compressed by a scraper fixed in the frame member to form a watercollecting means.

3. A compost-type toilet according to claim 2, wherein the belt is provided on both sides with projecting convex rims, and the said convex rims are compressed by the scraper.

4. A compost-type toilet according to claim 3, wherein a scraper is provided in the vicinity of the endless revolving belt for removing solids from the belt and transporting them into the treatment chamber of the means for treating the solid component.

5. A compost-type toilet according to claim 4, wherein a multiple number of scrapers are provided.

6. A compost-type toilet according to claim 5, wherein at least one of number of scrapers is in contact with the surface of the belt.

7. A compost-type toilet according to claim 1, wherein the means for treating a solid component comprises a treatment chamber divided into primary and secondary treatment chambers, stirring blades being supported on a shaft in the said treatment chambers in the vicinity of the bottom plate, additional stirring blades being supported on a shaft inside the supply device for an auxiliary agent for treatment of the solid component, and a port for removal of the auxiliary agent for treatment of solid component being formed on the bottom surface of said supply device.

8. A compost-type toilet according to claim 7, wherein the stirring blades disposed in the supply device and those in the treatment chambers are tuned by the same driving source.

9. A compost-type toilet according to claim 7, wherein a heater is incorporated in the bottom plate of the treatment chamber.

10. A compost-type toilet according to claim 7, wherein an opening is provided in the secondary treatment chamber, and is disposed to face the storing part.

11. A compost-type toilet according to claim 1, wherein the means for treating the liquid component comprises a multiple number of units, stacked facing in alternative directions; each of said units comprising a partition wall provided with a cut-out portion for dividing overflow between the treatment chamber and side chamber, a suitable adsorbent material for liquid component being packed into the treatment chamber, and a hole being formed on the bottom plate of the side chamber for removal of liquid component and circulating the air.

12. A compost-type toilet according to claim 11, wherein the treatment chamber of each of said units is on the bottom plate with a plate-formed heater, and the side chamber is provided with a heater.

13. A compost-type toilet according to claim 11, wherein a porous material is employed as the adsorbent material for liquid component packed in the treatment chamber.

14. A compost-type toilet according to claim 1, wherein the storing chamber communicates with the means for treating the liquid component.

15. A compost-type toilet according to claim 14, wherein the storage chamber is divided into two parts for excessive liquid component and solid component, respectively.

16. A compost-type toilet according to claim 1, wherein the casing comprises a part for liquid component formed in the lower part, a port in communication with said storing part being formed near the said storing part on open top surface.

17. A compost-type toilet according to claim 16, wherein the treatment chamber constituting the lower half of the solid-liquid separating means, means for treating liquid component and means for treating solid component are made to one unit which is disposed in the casing; the opening member of a bowl and the supply device for the auxiliary agent for treatment of solid component, which constitutes the upper half of the means for treating solid component, being placed at the opening on the top surface.

18. A compost-type toilet according to claim 1, wherein the ventilating passage is formed in the casing of the equipment, and one end of the said ventilating passage is in communication with the lower end of the means for treating the liquid component, while the other is connected with the air ventilating device.

* * * * *